United States Patent [19]

Krebs

[11] Patent Number: 4,991,196
[45] Date of Patent: Feb. 5, 1991

[54] TESTING COMMUNICATIONS SYSTEMS

[76] Inventor: Peter E. Krebs, 131 Staunton Road, Headington, Oxford, Great Britain

[21] Appl. No.: 378,707

[22] Filed: Jul. 11, 1989

[30] Foreign Application Priority Data

Jul. 12, 1988 [GB] United Kingdom ............... 8816518
Aug. 27, 1988 [GB] United Kingdom ............... 8820430
Sep. 21, 1988 [GB] United Kingdom ............... 8822138
Jan. 24, 1989 [GB] United Kingdom ............... 8901455

[51] Int. Cl.$^5$ ............................................. H04M 3/30
[52] U.S. Cl. ....................................... 379/27; 379/21; 379/29; 379/30
[58] Field of Search .................. 379/27, 21, 24-26, 379/29, 30

[56] References Cited

U.S. PATENT DOCUMENTS 4,424,421  1/1984  Townsend et al. ............... 379/27

Primary Examiner—Stafford D. Schreyer
Attorney, Agent, or Firm—Lackenbach Siegel Marzullo & Aronson

[57] ABSTRACT

Test apparatus for signalling systems having plural terminal units (26X) and line-pair connections (24X) therefor, comprises off-line test equipment (10) for parameters or conditions of said connections (24X), and connection means (30) of or for the test equipment (10) relative to said system. The connection means (30) comprising plural connectors (32X, 34X) as inputs for a number of said connections (24X) to said terminal units and multi-way switch means (40X) affording selection of said inputs (32X) one at a time for communication with other facilities of said off-line test equipment (10).

13 Claims, 4 Drawing Sheets

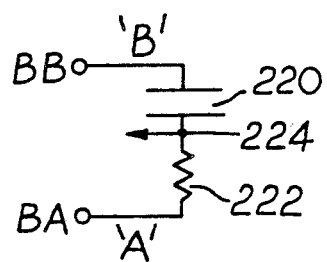
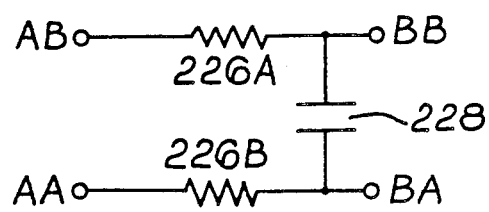
Fig. 5A          Fig. 5B
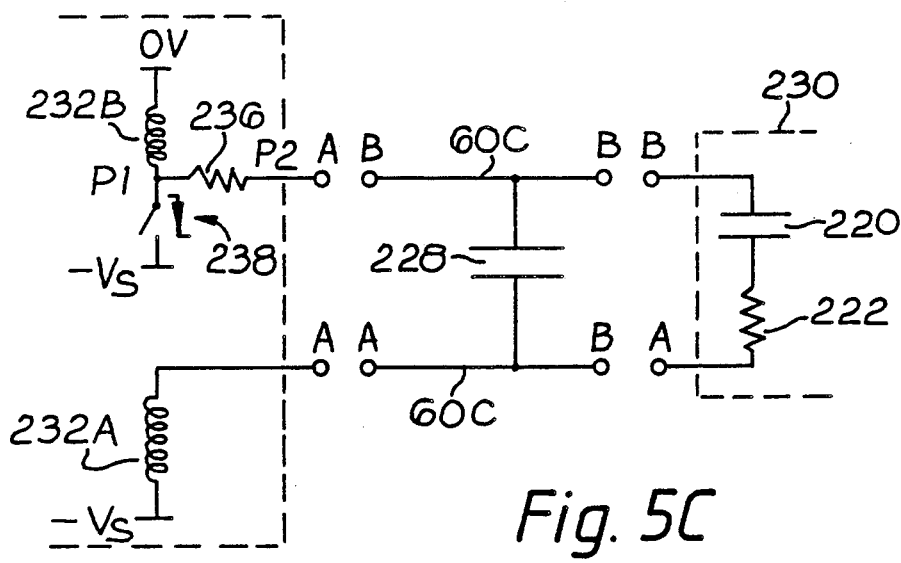
Fig. 5C
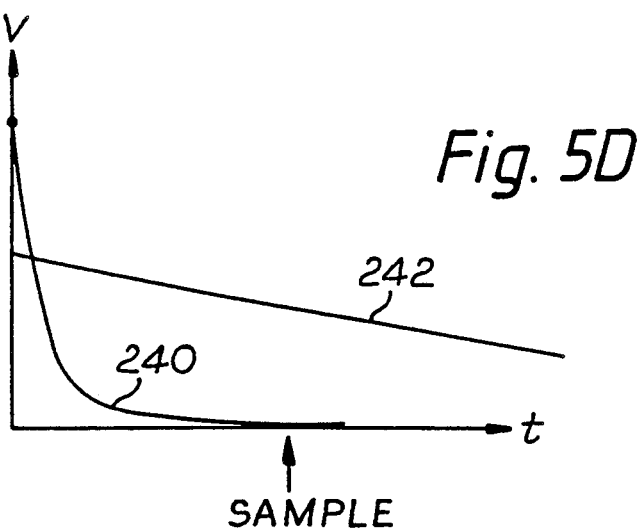
Fig. 5D

TESTING COMMUNICATIONS SYSTEMS

This invention relates to testing communications systems particularly to communications systems having plural operative units or terminals connected relative to a central unit or controller.

One specific system of interest is a telephone installation using a private branch exchange (PBX) or equivalent servicing a number of handsets or equivalent terminal units such as facsimile or telex or automatic answering or remote radio relay apparatus. Normally, such systems are installed by hard-wiring telephone sockets relative to a control unit (PBX) to serve between public telephone lines and equipment connected to the sockets. Furthermore, it is usual to await connection to the public telephone service before testing the local installation using power supplied from the public central office. This is believed to give rise to time-consuming delays where there are faults in the local installation, and it is an object of this invention to provide apparatus by which such delays are avoidable, and installations or parts of installations disconnected for test purposes can be serviced.

However, in satisfying that object, it is also clear that advantage will arise in relation to any disconnected wiring system, for example elsewhere in a telephone system, including at exchanges and at distribution boxes, and also in distributed computer installations and more generally for data communication systems, in fact anywhere utilising pairs of wires for signalling purposes and having a requirement to install significant wiring before full commissioning.

According to one aspect of this invention, there is provided test apparatus for signalling systems having plural terminal units and line-pair connections therefor, comprising off-line test equipment for parameters or conditions of said connections, and connection means of or for the test equipment relative to said system, the connection means comprising plural connectors as inputs for a number of said connections to said terminal units and multi-way switch means affording selection of said inputs one at a time for communication with other facilities of said off-line test equipment.

The plural connectors usually further include plural flying leads one for each connector and entry connection to the test equipment may also be by a flying lead unless the connection means is integrated into such equipment.

In a telephone installation to be serviced by a PBX, it is customary to find modularity in terms of sets or banks of ten possible connections, i.e. each set or bank containing up to ten connections, and it is useful for test apparatus hereof, at least in servicing disconnected wiring installations, similarly to have capability, for servicing such modules by way of the same number, i.e. ten, of said plural leads, then normally of matching two-wire type. The same applies to exchange equipment and distribution boxes, indeed to other connection systems using other numbers of connections per module, say 25 as is known.

Moreover, widely available proprietary connectors permit of connections for test purposes whether by way of teeing-in or otherwise by means involving breaking connections, and suitable test equipment is also available or readily devised, for example from or by my own company Silicon Arrays Limited.

In relation to such available telephone line test equipment, apparatus embodying this invention may thus comprise a connection unit having said multi-way switch means, a lead with a connector going to the test equipment and, selectable by the switch means, plural leads, conveniently associated or associatable with a multi-way pluggable connection block, with connectors going to lines to be tested. Such equipment and connection unit are both readily portable and the former can provide all necessary power for test purposes. Amongst the parameters or conditions of interest are, of course, continuity, ring signal response, line seizing, earth recall, two lines communicating etc., perhaps including electrical resistance, capacitance, etc.

This invention may, of course, be embodied in integrated apparatus having test equipment components including the customary feeding bridge and further equipped with a telecom socket for local telephone purposes and a test socket, and a plural-way, say ten-way or 25-way, switch with associated preferably pluggable plural-way, say ten-way or 25-way, connection set or block.

It will be appreciated that test apparatus hereof will be highly effective for testing installation local to a PBX including extension-to-extension communication.

In a modification hereof, it will be appreciated that useful testing can be carried out using a single lead and connector that is unplugged and replugged relative to different ones of the local or extension lines to be tested.

Parts of local wiring installations of particular interest are directly between modules, typically sets or banks of ten connections, basically in one-to-one correspondence. Clearly, that can be achieved using apparatus proposed above and used relative to any type of telephone unit, such as a hand set or a head set or desk set for hands-free operation, and/or test connections at successive ones of connected modules in turn.

However, an additional or alternative test apparatus may be connected, preferably by a set or bank connector to second and further ones of modules with line pairs connected between them, that test apparatus also comprising multi-way switch means and a connection, usually a socket, for a telephone hand set connection, advantageously also a connection to further test equipment.

Moreover, particular interest is found to be in simply checking continuity and polarity of inter-module connections, preferably quickly.

Accordingly, a second aspect of this invention concerns checking each inter-module connection, i.e. for plural line pair connections from one set or bank to another, and resides in a plural-way connector compatible with a said module and having a termination for each of said connectors, either as one termination successively connected to each said connection or as discrete terminations one for each said connection (then preferably incorporated into the plural-way connector).

Apparatus of this aspect may simply be additional to apparatus of the first aspect, perhaps particularly as a plural-way connector including a termination for each way. Then functionally equivalent to what is commonly known as a test shoe.

It is particularly preferred that the test apparatus of the first aspect or the additional or alternative test apparatus of the second aspect incorporate display means, conveniently on-off light devices, one for each of the inter-module connections concerned. Then, any faulty connection can be identified at a glance.

Moreover, it is preferred that the or each termination incorporate an asymmetric conducting device, typically a diode, so that correct direct indication can be obtained not only of continuity but also of polarity reversal. A preferred plural-way connector incorporating such polarity detecting termination(s) is capable of association with the connection module concerned in two alternative ways, one for correct polarity and the other for incorrect polarity, i.e. the opposite direction of the asymmetric conducting device, (which will give direct positive indication of polarity reversal).

Successive use of such alternative ways of association, for example plugging in, permits continuity checking as an adjunct to polarity testing, i.e. those that do not show up for either alternative have a continuity fault. Two sets of conductors may be useful for that purpose, one of which latches until after the alternative way of association is tested.

Using test apparatus at both ends of line pairs and having earth recall detection and indication at one end and line seize detection and indication at the other end is particularly useful when said other end further has selective connection to earth.

Thus, for a telephone wiring installation, with telephone hand sets coupled to each end, typically into test sockets of the apparatus at both ends, operation of the selective earth connection will give both of earth recall detection/indication at said one end and line seize at said other end for correct unbroken lines of the pair being tested, but only one will give detection/ indication if either line of the pair is broken and there will be identifying correspondence with which of the lines of the pair is broken, and neither will give detection/indication if both lines of the pair are broken.

In terms of practical implementation, the test hand set at the one end can be seen as being connected between line (of the pair) terminations (in the above said modules) themselves going over feeding bridge coils to earth and negative potentials, respectively, with earth recall detection/indication connected to the earth-connected line; and the test hand set at the other end can be seen also as being connected between line (of the pair) terminals (in the aforesaid modules) with line seize detection/indication also connected between those terminals and the earth line terminal having connection through a selective switch to earth. Then, operating the selective switch causes whichever line (of the pair) is more positively powered to be held or pulled up to (positive) earth, so that only earth recall detection/indication fails if only the earth line (of the pair) is broken, and only line seize detection/indication fails if only the other line (of the pair) is broken.

Said facility is powerful and, in itself, constitutes a further aspect of invention, i.e. whether embodied within test apparatus as aforementioned or simply in terms of minimum provisions to function as required for broken line detection and identification.

Moreover, at least with test apparatuses hereof, tracing of incorrectly commoned lines can be done, basically by detecting wherever there is a single line connected to a "wrong" extension.

Furthermore, short circuits can be covered in that a hand-set at said other end will be "dead" but the one end detection/indication (earth recall) will be activated, presumably even with no hand-set even plugged in.

Further aspects of invention concern operation of test equipment regardless of whether it is connected to a powered or an unpowered system to be tested. If the latter is powered it is possible for the voltage to oppose effectively offset, that of the test equipment powering, for example in telephone systems where direct connection of test equipment to a PBX involves a feeding bridge.

One further aspect of the invention relates to locating a line termination, either by a telephone or by a polarity conscious device such as a diode usually with a resistor often also an indicator connected. If all indicators on the test apparatus are connected to monitor via a test shoe or any plurality of connections or terminations as above, then a line termination, say by a telephone, may be rapidly located. Such a connection arrangement may be alternatively routed by a switch on the test apparatus.

Another further aspect of the invention relates to detecting mis-sequencing of wiring connections. If the indicators on the test apparatus are connected to monitor terminations as above, then arranging for such terminations to occur, possibly in sequential form, and afterwards arranging for such terminations to occur in a particular order, possibly sequential, will reveal one-to-one correspondence between ends, both correct and faulty. Alternatively, should the one-to-one correspondence not be sequential, but still be correct, this technique can be used to establish the actual one-to-one correspondence. This may be useful for avoiding the need to mark cabling, such cabling being selected essentially at random when wiring in. This is relevant where there are several identical cables, for example between local distribution points and outlets or line jacks.

Another further aspect of the invention is the combination of telephone communication between the ends using the wiring system under test, coupled with testing wiring integrity, either by making connection between two individual lines at a time, or using monitoring of several lines or pairs at a test shoe, with the possibility of switching between these two states. This makes practicable fault detection and repair with interactive voice communication on multiple lines between the two ends.

A yet further aspect of invention concerns detection of a condition, function or equipment giving rise to reactance, for example in a telephone system regarding whether a telephone socket is or is not a master socket (with which a ring capacitor is normally associated). Then, such master socket identification will be without requirement to plug in a hand-set. Accordingly, it is proposed to discriminate between a reactance-related characteristic/parameter for the condition/function/equipment concerned and for the transmission line involved. Suitable means could respond to difference of capacitance and/or discharge resistance.

Other signalling systems particularly for communication purposes as required for data transmission and computer installations etc will have similar requirements that can be met by embodiments of this invention, suitably varied and modified as may be required or desired.

Specific implementation of telephone system oriented embodiments of this invention will now be described by way of example with reference to the accompanying drawings, in which.

FIGS. 5A-D shows circuitry for normal United Kingdom ringing, idealized equivalent circuit for permitted transmission lines, addition of resistor for sampling purposes, and illustrative decay curves, respectively.

Figure 1:
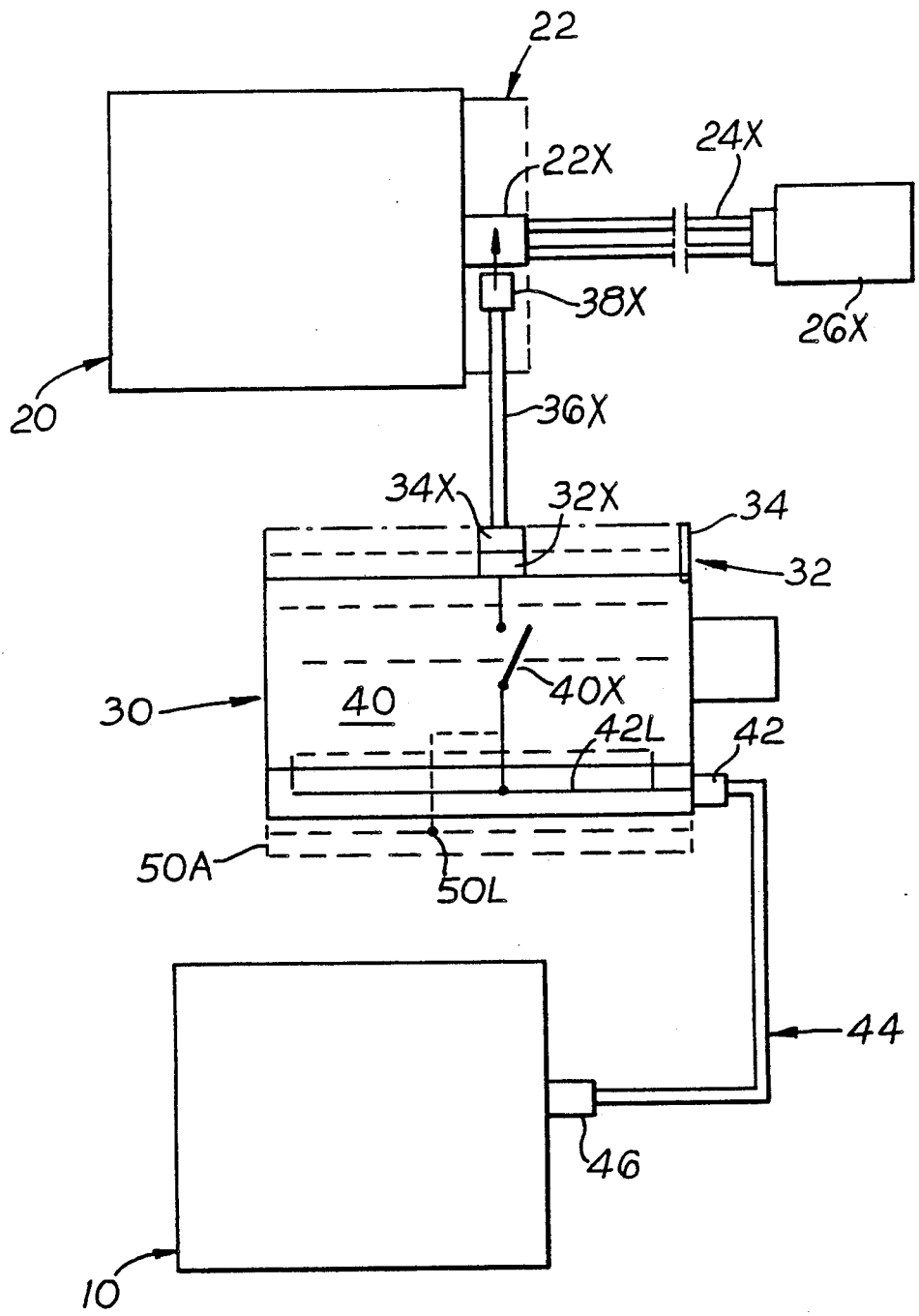
FIG. 1 is an outline block diagram of a first embodiment.

In FIG. 1, an off-line telephone tester is indicated at 10 and may be of a type available from my company as above-mentioned. A PBX is indicated at 20 with connectors 22, of which there will usually be at least one module of either ten or twenty-five and of which one only is indicated specifically at 22X. The connectors 22 go to local extension lines, see 24X, to telephone handset 26X.

For the purpose of embodying this invention further apparatus is shown at 30 having a set or block of connector sockets 32, of which there will also conveniently be a module either of ten or twenty-five to match modules for connectors 22, and of which one only is indicated specifically at 32X. The connectors 32 are for pairs of conductors, see 36X, going via plugs, see 34X, to connectors, see 38X, for interfitting with the connectors 22, respectively, by teeing-in or other breaking connection that serves to connect to the line pairs 36, respectively, extension line pairs, see 24X, serving for local extension-to-extension calls.

It is preferred to have the connection socket arrangement 32 as a pluggable system so as to facilitate changing for interfacing of different makes of connectors.

The apparatus 30 further has an output connection 42 serving for a line pair 44 going to a standard telephone connector 46 as normal for use of the off-line tester 10.

The remainder of the apparatus 30 is a multiple-way switch 40 serving to connect any one of the local extension lines 24 to the tester input line 44, see switch 40X to line 42L, possibly also serving to offer similar selectable connection of a test socket.

The tester 10, at least as available from my company, assures capability for testing of each extension line for the usual parameters including continuity, electrical resistance if required, also ring signal generation and response, line seizing, earth recall and two extensions connecting with each other.

The described equipment can serve to test extensions fully prior to powering up of the PBX from the public telephone system, i.e. taking temporary power from the tester 10.

It will be evident that the further apparatus 30 may be connected onto the tester 10 as a module or incorporated into the tester as a single unit at least then containing the customary feeding bridge plus a telecommunications socket and another test socket, then with switchable flying lead provisions for connection to the PBX extensions.

Turning to FIGS. 2A-C and FIG. 3, apparatus corresponding to 10 and 30 of FIG. 1 is shown at 50, and connections corresponding to 36X, 38X at 56X, 58X of which 58X conveniently represents a unitary multi-way connector of plug-in adaptor type making at A with a multi-connection module 60A connected one-to-one with a similar module 60B via line-pair wiring 60C to be tested.

Figure 2A:
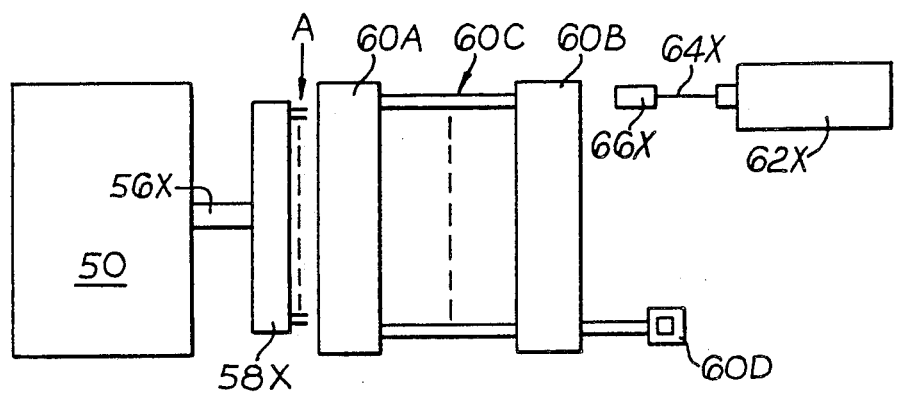
FIGS. 2A–2C are outline block diagrams of variant embodiments.

A telephone handset is indicated in FIG. 2A at 62X with a flying lead 64X and connector 66X for connection into the module 60B, either as a simple provision moved along or as one of a number of handsets each connected to a different one of the ways of the module 60B. For FIG. 2A, testing can now be as previously described, but will clearly include wiring 60C between the modules 60A and 60B. The wiring 60C may, of course, itself include line jacks/outlets, indeed the block, referenced 60B could represent a distributed installation of terminal units. Likewise, there may be some line pairs out of the module 60A that go to outlets and can be tested individually, and one is shown from module 60B at 60D.

Figure 2B:
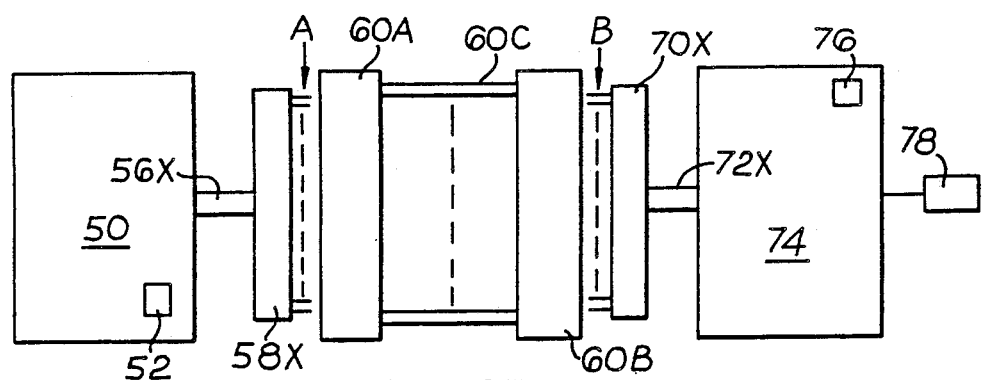

FIG. 2B shows another multiway connector at 70X also of plug-in adaptor type making connections at B with the module 60B and which may be similar to that referenced 58X. Connector 70X is shown at 72X connected to switching equipment 74 that may be similar to that referenced 30 in FIG. 1 and with handset and tester connectors at 76 and 78, or, indeed, may be similar to that referenced 50.

Figure 2C:
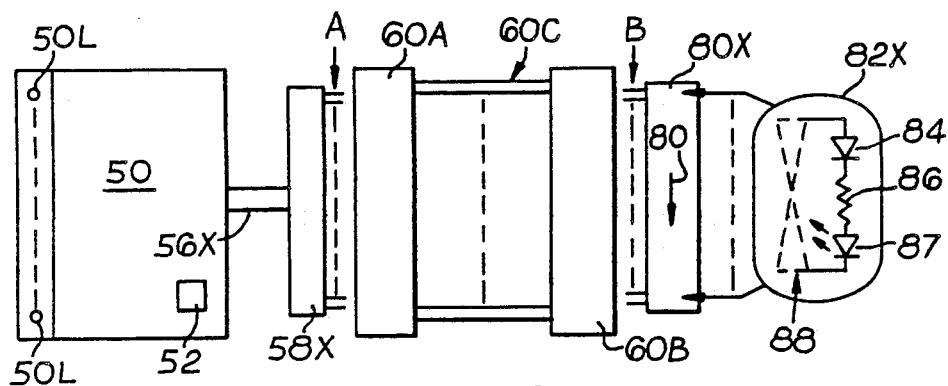

FIG. 2C shows a particularly preferred embodiment in which connector 80X is similar to that referenced 70X but has additional terminations for each way or line-pair of the module 60B to which access is gained by the adaptor 80X. A preferred form of termination is indicated at 82X as including a diode 84 as well as a suitable resistor 86. In addition, the test apparatus 50 is shown with a bank 50A of indicator light devices 50L, typically LEDs, one for each way of the modules 60A,B. The bank 50A will, of course, be integrated into at least the unit 30 of a multi-unit or -module embodiment for units 10 and 30 of FIG. 1.

The preferred termination 82X is shown further including its own indicator, typically as a LED 87, which could be additional or alternative to the bank 50A. In fact, a single termination may be used to test individual line pair connectors including individual outlets.

In operation, with the diodes 84 all poled for correct connection of the wiring 60C, both of continuity and correct polarity of connection will be detected and indicated simultaneously by the light devices 50L. Any connection(s) not indicated as correct may be further tested for continuity alone if the diode 84 is reversed. That is very conveniently achieved when the adaptor 80X is reversible in its association with the module 60B, say with "correct" polarity of association indicated, see arrow 80.

Figure 3:
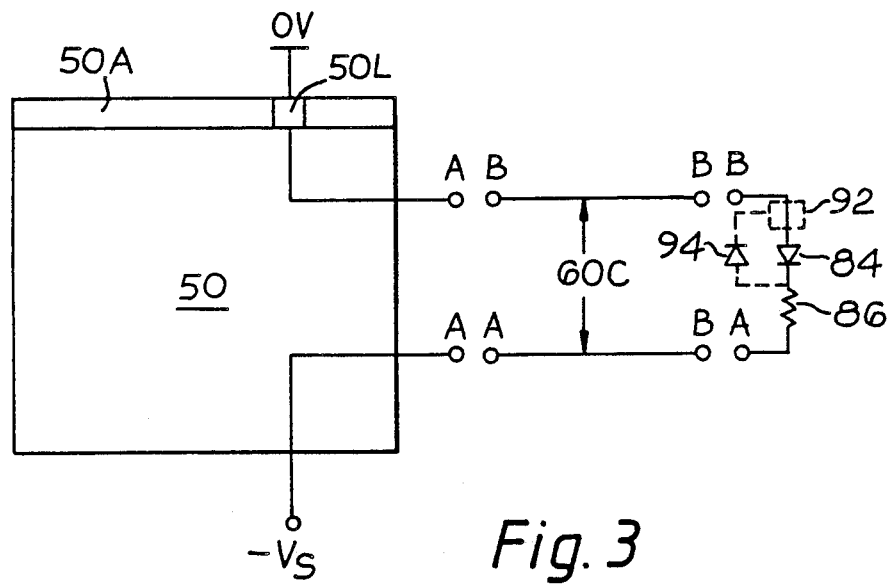
FIG. 3 is an equivalent circuit diagram for the FIG. 2C variant.

The effective equivalent circuit for each connection way or line pair involved is indicated in FIG. 3, which is believed to be self-explanatory.

The test equipment 30 (or 50 or 74) preferably includes an effective sequencing mode, i.e. where line pairs thereto (at 34 via 36X or at 56X) are scanned and tested successively one at a time, see provision 48 of FIG. 1 for automatically operating switches 40. That, of course, will also show up misconnections, say in the wiring at 60C, i.e. where one-to-one correspondence between modules 60A and 60B is present but incorrect, in which case wrong one(s) of the light devices 50L will operate at the wrong time. Open circuits will, of course, also be detected effectively as lack of continuity.

It will be appreciated that the adaptor 80X could have a switching provision for effective reversal of the polarity of the terminations, see dashed at 88 in FIG. 2C. Connecting-in of alternative oppositely poled diodes is shown by dashed switch 92 and connections for diode 94 in FIG. 3. Moreover, instead of the aforementioned sequencing automatically, a simple termination could be used on a flying lead basis to mate with each of the connections of the module 60B individually as desired, then to be reversed or, more likely, with a pushbutton or touch-operated switch for different polarities.

It will also be appreciated that the equipment referenced 74 in FIG. 2B can itself have a sequencing provision say pushbutton operative particularly useful in conjunction with a telephone handset connected at 76, and can assist in establishing point-to-point connection of that handset with a further handset connected to the equipment referenced 50, via socket 52. That enables actual voice communication to be tested, as well as ring, line seize and earth recall. Short circuits will, of course, show up in such testing.

Variations of application should be evident with or without either of the equipments referenced 10 and 74. In general, battery powered, stand-alone equipment is provided, say in an easily portable carrying case for full hands-free testing of disconnected pair wired installations as may be required.

Figure 4:
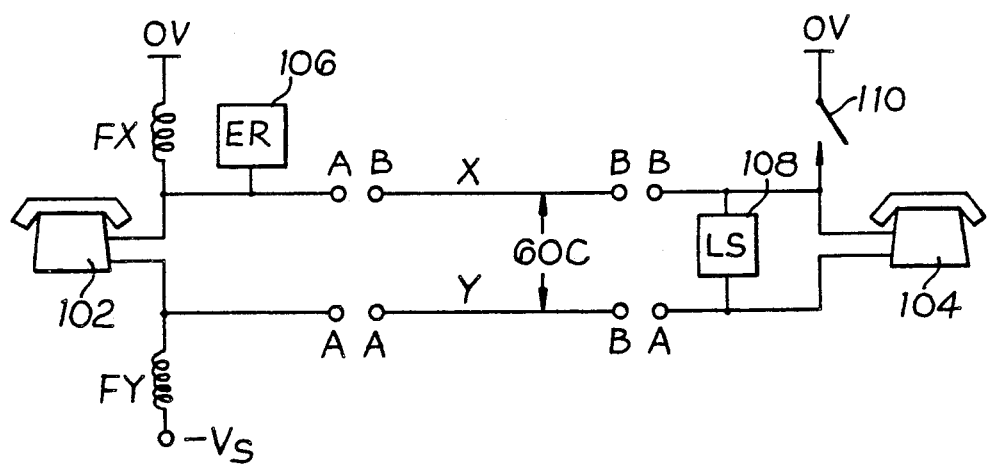
FIG. 4 is an outline circuit diagram for use of selective earth connection.

Turning to FIG. 4, a particular preferred provision, itself an aspect of invention as aforementioned, is indicated for lines X and Y of a pair to be tested, shown going at both ends through telephone hand-sets 102 and 104, respectively; at one end further to earth (OV) and to negative ($-Vs$) potentials via feeding bridge coils FX and FY, respectively, also to an earth recall detector and indicator 106 at the earth potential side (X line); and at the other end connected together through a line seize detector and indicator 108, also to a selectably-on switch 110 to earth at the earth potential side (X line).

If both of the X and Y lines are unbroken, both of the detectors/indicators 106/108 operate, including when the switch 110 is closed. If only the X line is broken, and switch 110 is closed, the earth recall detector/indicator 106 will be off, but current will flow relative to the negative potential ($-Vs$) through the Y line to operate the line seize detector/indicator 108 and partially power the handset 104. If only the Y line is broken, and switch 110 is closed, the line seize detector/indicator 108 will not come on, but the earth recall detector/indicator will come on when the test telephone hand set is off-hook to take loop current.

Another feature or aspect of practical value concerns advantageous use of two or more termination resistance values. Thus, using a non-polarised lower value telephone looping resistor, and a polarised indicator terminating resistor, gives rise to detectably different conditions at the test equipment for on-hook and off-hook states of the handset on the line pair being tested. Specifically, the line indicator will respond to either termination, but the line seize indicator will respond only to the telephone termination.

Various combinations of line, seize and recall etc indicators at either end permit testing of correct pair wiring, polarity reversals and open circuits, also affording fast far-end phone location. Also, ring indicator at the far end can be used for signalling that speech communication is desired, which can be available by a simple change of mode.

Tester and sequencer units hereof can, of course, be rather similar, and it can be advantageous to standardize them into one unit operable as either, according to the state of a mode selection facility.

Turning to FIG. 5, a standard ringing circuit as used in the United Kingdom has a capacitor 220 and resistor 222 connected in series across the line pair A,B and a node tapping 224 for ring signal. An idealized equivalent transmission line impedance representation has equal resistors 226A,B connected by a capacitor 228 and values, say 630SZ and 375 $\mu$F, can be for maximum permitted transmission line length (presently 7.5 kilometres). In FIG. 5C the capacitor 220 can be at 1.8 microfarad and resistor 222 at 420 kilohms of a master socket 230, for effective line capacitance 228 of up to about 0.4 nanofarad. Speech chokes 232A,B for lines A,B at the exchange 234, and a sampling resistor 236 are also shown.

It will be appreciated that the ringing circuit (FIG. 5A) has much higher capacitance than the transmission line and also substantial discharge resistance (at least compared with negligible for the transmission line). For a voltage transition of either sense, say 5 volts or more, applied at B, indicated at 238, there will be much faster decay of transmission line capacitance 228 (see 240) than of the ring capacitor 220 (see 242). Clearly, sampling at a time corresponding to the line 240 being below 242 will detect whether a socket being tested is indeed a master socket, see discriminator 244 with detector 246 for edge 238, timer 248 for sampling and output 250 indicating master or not. Line capacitance (228) will decay through resistor 222 so sampling will be down to about 1% after 0.5 seconds, but any ring capacitor 220 present will have substantial charge, typically about 50%, of start, thus higher than decay of 228 despite starting lower.

It is further envisaged that systems embodying this invention can be used with all necessary particular tailoring to requirements for other than standard telephone voice systems, for example including data communications and computer connection networks.

What is claimed is:

1. Test apparatus for installations having plural terminal units and line-pair connections therefor, such installations being of or for use within wider signalling systems, the test apparatus comprising off-line test equipment for parameters or conditions of said line-pair connections, and connection means of or for the off-line test equipment relative to said installation, the connection means comprising plural connectors as inputs to be made on a temporary basis for a limited number, normally less than all, of said connections to said terminal units, and multi-way switch means affording selection of said inputs one at a time for communication with other facilities of said off-line test equipment.

2. Test apparatus according to claim 1, wherein said plural connectors comprise flying lead means one for each of the connectors.

3. Test apparatus according to claim 1, wherein said number corresponds to line-pair capacity of a connection module of said installation in relation to said connections, and said associated connectors are themselves of a similar compatible module.

4. Test apparatus according to claim 2, wherein the module of associated connectors comprises an output stage of a unit affording said multi-way switch means and a connector associated with entry connection to the off-line test equipment for said communication to its other facilities.

5. Test apparatus according to claim 1, further comprising connection termination means for temporary association with said number of connections at another location in said installation.

6. Test apparatus according to claim 3, further comprising connection termination means including another module of connectors for temporary association with said number of connections at another location in said installation and having plural connection terminations one for each of said number of connections.

7. Test apparatus according to claim 5, comprising, for the or each connection termination, polarity sensitive means.

8. Test apparatus according to claim 7, wherein the or each polarity sensitive means is selectively reversible.

9. Test apparatus according to claim 1, comprising means for operating the plural switch means sequentially.

10. Test apparatus for installations having plural terminal units and line-pair connections therefor, such installations being of or for use within wider signalling systems, the test apparatus comprising off-line test equipment for parameters or conditions of said line-pair connections, and connection means of or for the off-line test equipment relative to said installation, the connection means comprising plural connectors as inputs to be made on a temporary basis for a limited number, normally less than all, of said connections to said terminal units, and multi-way switch means affording selection of said inputs one at a time for communication with other facilities of said off-line test equipment, and connection termination means for temporary association with said number of connections at another location in said installation wherein connection termination means at one end of a telephone line pair includes feeding bridge coils from each line to different electric potentials one of which is earth and earth recall detection means connected to the earthed line, and connection termination means at the other end of said telephone line includes switch means to earth for said earthed line and line seize detection means assist the lines of the pair.

11. Test apparatus for installations having plural terminal units and line-pair connections therefor, such installations being of or for use within wider signalling systems, the test apparatus comprising off-line test equipment for parameters or conditions of said line-pair connections, and connection means of or for the off-line test equipment relative to said installation, the connection means comprising plural connectors as inputs to be made on a temporary basis for a limited number, normally less than all, of said connections to said terminal units, and multi-way switch means affording selection of said inputs one at a time for communication with other facilities of said off-line test equipment, connection termination means for temporary association with said number of connections at another location in said installation, and a capacitive and resistive termination corresponding to a telephone ringing circuit, and sampling means operative after an interval from a signal transition whereat inherent capacitance of a line pair concerned will have decayed well below charge of ringing circuit capacitance.

12. A method of testing installations having plural terminal units and line-pair connections therefor, such installations being of or for use within wider signalling systems, the method involving use of off-line test equipment for parameters or conditions of said connections and associated connection means having a plurality of input connectors together with switch means affording selection of said inputs one at a time for communication with said off-line test equipment, and the number normally less than all of said line-pair connections to said inputs on a repeating basis until all of said line-pair connections have been tested one at a time.

13. A method of testing installations having plural terminations and line-pair communications therefor, such installations being of or for use within wider signalling systems, the method employing portable off-line test equipment for parameters and conditions of said line-pair connections, associated connection means for the off-line test equipment relative to said installation, and associated multi-way switch means affording selection between inputs thereto for said connection means, one at a time, and other facilities of the off-line test equipment, the method comprising the steps of:
  (a) taking the portable off-line test equipment and the associated connection means and multi-way switch means to site of said installation
  (b) using plural connectors of the associated connection means to make temporary connections between plural inputs of the associated multi-way switch means and a limited number of said line-pair connections
  (c) performing a cycle of operation of the off-line test equipment whereby said limited number of line pair connectors are tested by the off-line test equipment one-at-a-time
  (d) re-using said plural connectors for a limited number of other sizes of said line-pair connections and performing another cycle of operation of said test equipment relative thereto
  (e) repeating step (d) until all of said line-pair connectors have been tested.

* * * * *